UNITED STATES PATENT OFFICE.

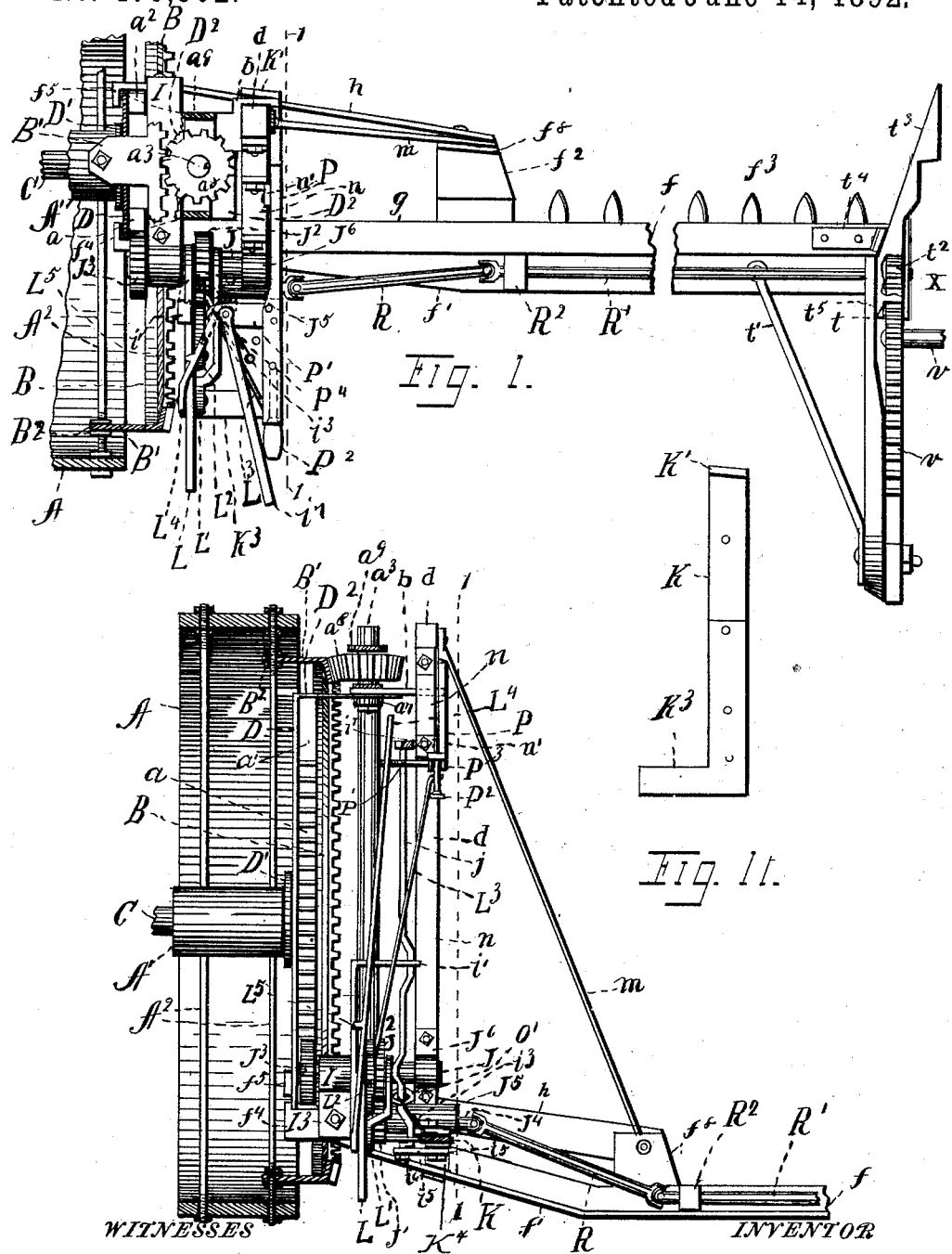

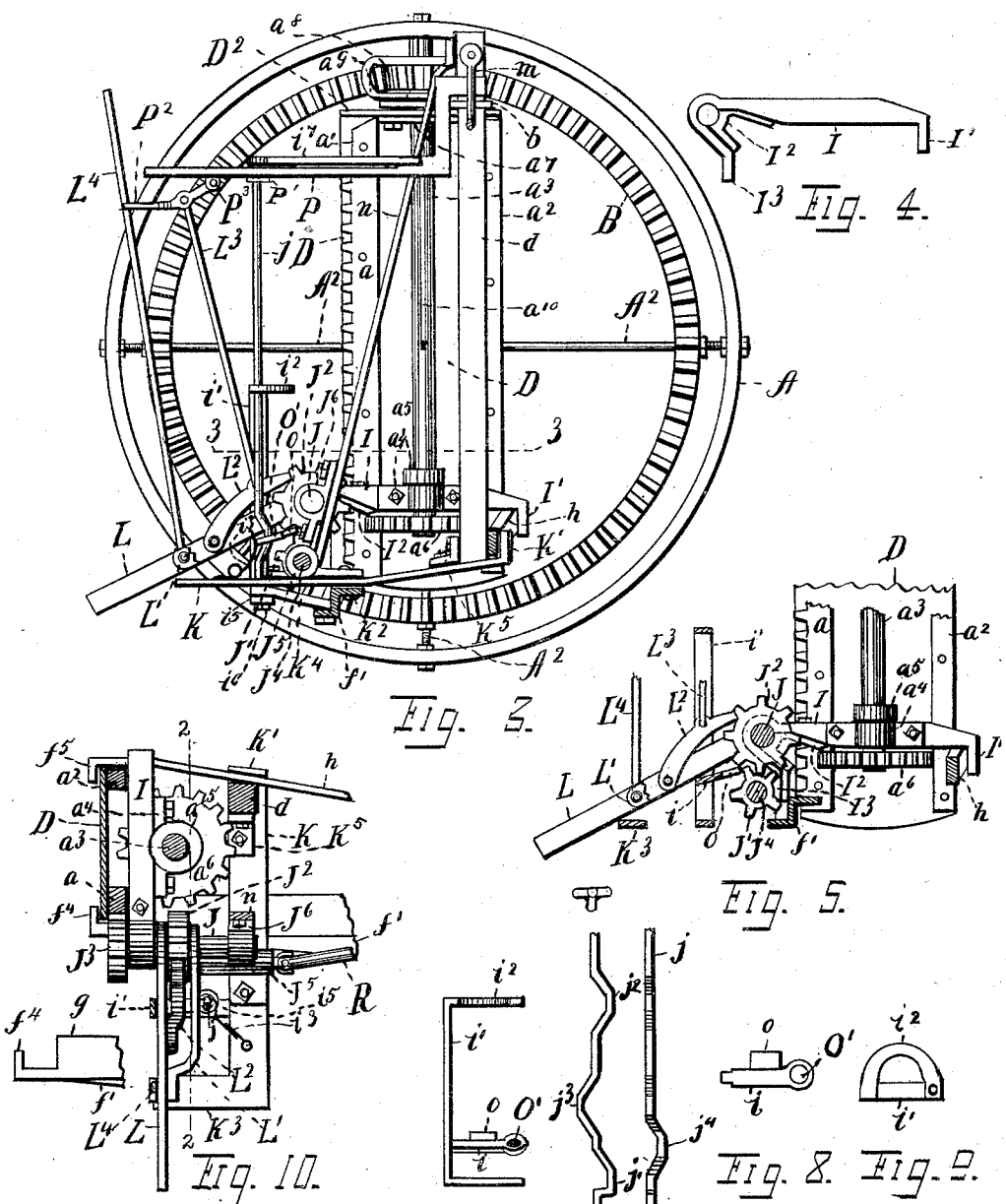

GEORGE SCHUBERT, OF WALNUT, TEXAS.

RAISING AND LOWERING MECHANISM FOR HARVESTERS.

SPECIFICATION forming part of Letters Patent No. 476,902, dated June 14, 1892.

Application filed May 12, 1891. Serial No. 392,533. (No model.)

*To all whom it may concern:*

Be it known that I, GEORGE SCHUBERT, a citizen of the United States, residing at Walnut, in the county of Bosque and State of Texas, have invented a new and useful Raising and Lowering Mechanism for Harvesters, of which the following is a specification.

This invention relates to improvements in a raising and lowering mechanism for harvesters, and more especially to a mechanism so arranged that it can be operated by the driver from his seat without checking the machine and while the machine is in motion; and my object is to construct such mechanism so as to be light, inexpensive, and durable, and so as to be employed to elevate the machine over low obstructions in the grain instead of driving around such obstructions. I attain these objects by the mechanism illustrated in the accompanying drawings, in which—

Figure 1 is a top plan view of a harvester provided with my improvements, with the master-wheel shown in section and partly broken away and part of the plate D and toothed rim are also broken away. Fig. 2 is a view from the rear of part of the machine with the master-wheel, the bar K, and the toothed rim shown in section. Fig. 3 is a side or face view of the parts shown in Fig. 2, looking to the left from line 1 1. Fig. 4 is a detail view of a bracket. Fig. 5 is a detail sectional view looking to the left from line 2 2, Fig. 10. Fig. 6 is a detail view of the bracket provided with the locking-dog. Fig. 7 is a plan and two side views of a rod carrying the bracket shown in Fig. 6. Fig. 8 is a plan view of the locking-dog. Fig. 9 is a top plan view of the bracket. Fig. 10 is a sectional view on line 3 3, Fig. 3, showing parts below in full lines; and Fig. 11 is a detail view of the bar K.

Referring to the drawings, A designates the master-wheel, A' is its hub, and $A^2$ are spokes. To said spokes $A^2$ is secured the toothed rim B by the lugs B', as shown in Figs. 1 and 2.

C designates the axle upon which the master-wheel rotates. Said axle C is rigidly secured to near the center of the plate D.

D' is a washer secured to the rear of the plate D to receive the axle C.

$a$ designates a rack riveted to the grainward or inner and rear edge of the plate D, with the teeth projecting rearward and flush with the edge of the plate D. The upper end of the rack $a$ may be left blank, as shown at $a'$ in Fig. 3.

$a^2$ is a bar riveted to the grainward or inner side of the front edge of the plate D to strengthen said plate D. The rear edge of said plate D is strengthened by the rack $a$. The upper end of the plate D is extended and bent to a horizontal position, forming the projection $D^2$. To said projection $D^2$ is secured the bracket $b$, encircling the post $d$ and having a vertical movement on said post $d$.

$f$ designates the finger-bar, of the ordinary Z form, provided at its front edge with guards $f^3$ and inner shoe $f^2$.

$f'$ is an inward extension extending to the rear edge of the plate D with its front flange $g$ cut off, as shown to the left of Fig. 10, to be adjacent the rack $a$, with the vertical angle or web extending past the plate D and bent forward at $f^4$ on the back of said plate D. (See Fig. 1.)

$h$ designates a bar secured at one end to the shoe $f^2$ and with its other end extending to and past the front edge of the plate D, with its end turned rearward at $f^5$ on the back of the plate D.

I designates a bracket extending over the bar $h$, with its end I' turned down and secured to the bar $h$ adjacent the bar $a^2$, with its other end extending to the rear adjacent the rack $a$, with its end $I^3$ projecting beyond said rack $a$ and turned down, as shown in Fig. 4, so as to form, in connection with the bracket $I^2$, a bearing for one end of the shaft J.

K designates a cross-bar extending from the bar $h$ to and over the extension $f'$, with its front end K' bent upward on the bar $h$ and secured to said bar a suitable distance grainward from the plate D (see Fig. 1) and secured to the extension $f'$ by the rivet $K^2$, and its rearward-projecting end is braced in position by the brace $K^4$.

$K^3$ designates a part of the bar K turned stubbleward toward the master-wheel A to furnish a support for the fore end of the lever L. On said bar K is located the post $d$, with its lower end secured to the bar $h$ and by the bracket $K^5$ to the bar K. (See Fig. 3.) The upper end of said post $d$ is braced in position by the braces $m$ and $n$. The brace $m$ is secured with its lower end to the vertical flange of the shoe $f^2$ and with its upper end to near the upper end of the post $d$, and the brace $n$ is secured at its upper end to near the upper end of the post $d$ and with its lower end to the bar K with the rivet $K^2$. (See Fig. 3.)

P designates a bar secured at one end to the post $d$ beneath the brace $m$ and above the bracket $b$, extending rearward with a short crook downward, as shown in Fig. 3, and secured to the brace $n$ by the bracket $n'$. To the rearward-projecting end is secured the bracket P' a proper distance from bracket $n'$, so as to receive the rod $j$ in a vertical position.

To near the rear end of the bar P is pivoted a thumb or hand latch $P^2$ by the stud $P^3$ for the purpose hereinafter stated.

$a^3$ designates a shaft in a vertical position and provided near its lower end with a bearing $a^4$, secured to the bracket I, and a collar $a^5$, secured to the shaft $a^3$ just above the bearing $a^4$, and a pinion $a^6$ below the bearing $a^4$, thus preventing any endwise movement of the shaft $a^3$ in the bearing $a^4$. Said shaft $a^3$ extends, with its upper end, through the bearing $a^7$, secured to the projection $D^2$, and projects, with its upper edge, through a perforation in said projection $D^2$.

The shaft $a^3$ is provided with a keyway $a^{10}$ and a bevel-pinion $a^8$ above the bearing $a^7$ in position to engage with the toothed rim B, and provided with a key to engage the keyway $a^{10}$ to prevent the bevel-pinion $a^8$ from rotating on the shaft $a^3$.

$a^9$ is a bracket secured at its ends to the projection $D^2$ and curved over the bevel-pinion, as shown in Fig. 3, to prevent its upward movement on its shaft $a^3$.

J designates a shaft journaled with its grainward end in a bearing $J^6$, secured to the brace $n$, (see Fig. 3,) and a bearing near its other end in the bracket I and provided with a pinion $J^3$ on its (said) projecting end in position to engage with the rack $a$ and a pinion $J^2$ near its center.

L designates a lever pivoted on the shaft J between the bracket I and the pinion $J^2$, (see Fig. 1,) and provided with an arm L', pivoted on the shaft J on the opposite side of the pinion $J^2$, with its other end projecting rearward and secured to the lever L, thus preventing the rear end of lever L from having any lateral movement. Said lever L and arm L' are also employed as a brake, as hereinafter described.

$L^2$ designates a dog pivoted to the lever L and engaging with its free end with the pinion $J^2$.

To near the free end of the dog $L^2$ is pivoted a rod $L^3$, connecting the dog $L^2$ to the hand-latch $P^2$, by which the dog $L^2$ can be disengaged from the pinion $J^2$.

$L^4$ designates a rod pivoted to the lever L a suitable distance from the pivoted end of the lever L and provided with a stud $L^5$ about six or eight inches from its pivoted end and in position to be engaged with or disengaged from the toothed rim B. When said rod is not in operation, it is allowed to rest in a hook $P^4$, formed on the end of the bracket P', as shown in Figs. 1 and 2.

$i'$ designates a bracket formed about as shown in Figs. 6 and 9, and provided with a locking bar or dog $i$, loosely secured to the bracket $i'$ and provided with a large eye O' to receive the rod $j$, and an extension $o$ (see Fig. 8) to engage between the pinions $J^2$ and J' so as to act as a dog to lock said pinions in place. (See Fig. 5.) The upper portion of the bracket $i'$ is curved forward at $i^2$ to provide room for the rod $l^3$ when the lever L is operated. The free ends of the bracket $i'$ are perforated to receive the rod $j$. Said rod $j$ is curved or crooked about as shown in Fig. 7 and extends through the free ends of the bracket $i'$ and the dog $i$, extending down on the grain side of the arm L', while the bracket $i'$ extends down on the opposite side of the lever L, so that when the rod $j$ is turned one-half round, so as to bring the crooks $j'$ and $j^2$ grainward and the crook $j^3$ stubbleward against the arm L', the arm L' and lever L will be drawn together against the pinion $J^2$, clamping said pinion, and thus acting as a brake on said pinion, so as to lower the machine gradually. When the rod $j$ is turned in position, as shown in Figs. 1 and 2, the crook $j^4$ projects rearward, thus disengaging the dog $i$ from the pinions $J^2$ and J', and when moved in the opposite direction, as shown in Fig. 3, the crook $j^4$ projects forward, thus allowing the dog $i$ to engage with the pinions $J^2$ and J'. Said dog $i$ is caused to engage with the pinions by a spring $i^3$, secured to the bar K and passing with its upper end against the free end of the dog $i$. The eye O' in the dog $i$ is of sufficient size to allow the dog the proper amount of play. The lower end of the rod $j$ extends through a bracket $i^5$, secured to the lower side of the bar K (see Fig. 3) and provided with a pin or nut $i^6$ to prevent its disengaging from said bracket $i^5$, and said rod extends with its upper end through a bracket P' and is provided with a handle $i^7$ by which it is operated.

$J^4$ designates a short shaft journaled in a long bearing $J^5$ with its stubble end projecting through said bearing and provided with a pinion J' on said projecting end in position to engage with the pinion $J^2$, and connected with its other end by a universal joint to the shaft R, which is in turn connected by a universal joint to the shaft R'. Said shaft R' has near its stubble end a bearing $R^2$, secured to the rear and lower flange of the finger-bar $f$. Said shaft R' extends along the rear flange to the outer end of the finger-bar $f$, with a bearing near its outer end in the bar $t$, secured to the finger-bar $f$ and projecting to the rear.

$t^2$ designates a pinion secured on the shaft R' adjacent the outer side of the bar $t$.

$v$ is a segment pivoted at its rear to the rear end of the bar $t$ and projecting forward in position to engage with the pinion $t^2$.

$v'$ is a stud or bolt secured in the segment $v$ and forming the axle for a grain-wheel.

$t'$ is a brace secured to the rear end of the bar $t$ and to the finger-bar $f$.

$t^3$ designates the usual grain-board secured to the finger-bar $f$ by the bracket $t^4$ and cut out to provide room for the pinion $t^2$ and with its inner edge $t^5$ projecting past the inner side of the segment $v$.

$x$ designates a plate secured to the outer side of the grain-board, providing a support for the outer end of the shaft $R'$ and extending toward the rear past the outer edge of the segment $v$, thus furnishing a guide for said segment $v$.

In Fig. 1 the grain-board $t^3$ is partly broken away to show the pinion $t^2$.

In raising the machine while in motion the driver moves the lever $i^7$ in position, as seen in Fig. 3, and then moves the rod $L^4$ in position, as seen in Fig. 3, engaging the stud $L^5$ with the toothed rim B, by which said rod $L^4$ will be elevated, thus elevating the lever L and turning the pinion $J^2$ forward by means of the dog $L^2$. Said pinion $J^2$ is secured to its shaft J, and thus turns the pinion $J^3$ in the same direction, and, it being in engagement with the rack $a$, will elevate the inner side of the machine, and the pinion $J^2$, being in mesh with the pinion $J'$, will rotate the shafts R and $R'$, by which the outer end of the machine is elevated. When the lever L is elevated to a sufficient height, the stud $L^5$ is disengaged from the toothed rim B, and the lever L is allowed to drop down in position, as seen in Fig. 3, the dog $i$ engaging between the pinions $J^2$ and $J'$ to prevent their backward movement. Then the stud $L^5$ is again engaged with the toothed rim B. Said operation is repeated until the machine is elevated to the desired height. The lever L is extended to the rear a proper distance, so that the machine can be elevated by hand while at rest, if so desired.

To lower the machine, the driver moves the lever $i^7$ in position, as seen in Fig. 1, thereby disengaging the dog $o$ and clamping the lever L and arm $L'$ against the pinion $J^2$, when he grasps the hand-latch $P^2$, pressing it against the bar P, thus disengaging the dog $L^2$ from the pinion $J^2$, when he will slacken the lever $i^7$ to allow the pinions to rotate backward, thus allowing the machine to lower. When the machine is thus lowered to the desired level, the hand-latch $P^2$ is released, allowing the dog $L^2$ to engage with the pinion $J^2$ and lock said pinion in place. The lever $i^7$ can be moved in position as seen in Fig. 3 or left in position as seen in Fig. 1.

I do not broadly claim the combination of a traction-wheel to raise the machine, nor broadly the combination of a vertical plate provided with a rack. Nor do I claim, broadly, the raising and lowering of both ends of the machine simultaneously; but What I do claim as new, and desire to secure by Letters Patent, is—

1. In a harvester, the combination, with a rod $L^4$, provided with a stud $L^5$ to engage with a moving gear-wheel or toothed rim B and pivoted near its lower end to a lever L, said lever L pivoted on the harvester-frame or on the shaft J, of a ratchet-wheel or pinion $J^2$ on the shaft J, a dog $L^2$, pivoted to the lever L and in position to engage with the ratchet wheel or pinion $J^2$, a pinion on the shaft J in position to engage with a rack $a$, and a dog $i$, as shown, and for the purpose described.

2. In a harvester, the combination, with a rod $L^4$, provided with a stud $L^5$ to engage with a moving gear-wheel or toothed rim B and pivoted near its lower end to a lever L, said lever L pivoted on the harvester-frame or on the shaft J, of a ratchet-wheel or pinion $J^2$ on the shaft J, a dog $L^2$, pivoted to the lever L and in position to engage with the ratchet wheel or pinion $J^2$, a pinion on the shaft J in position to engage with a rack $a$, a pinion $J'$ on a shaft $J^4$, said pinion $J'$ in mesh with the pinion $J^2$, a dog $o$ to engage with said pinions, the grain-wheel adjusted by the shaft $J^4$, as shown, a bracket $i'$, and a rod $j$, supported by the harvester-frame, as shown, and for the purpose described.

3. In a harvester, the combination of a lever L, pivoted on a shaft J and provided with a rod $L^4$, having a stud $L^5$ on arm $L'$, secured to the lever L and pivoted on the shaft J to prevent the lever L from swinging laterally, a pinion $J^2$ on the shaft J, a dog $L^2$, pivoted to the lever L in position to engage with the pinion $J^2$ in connection with a pinion $J^3$ in position to engage with a rack $a$, a shaft $J^4$, provided with a pinion $J'$, a rod $j$, a bracket $i'$, a dog $i$, and a spring $i^3$, as shown, and for the purpose described.

4. In a harvester, the combination, with a shaft $J^4$, provided with a pinion $J'$, of a bracket $i'$, supported by a rod $j$, carried by the frame of the harvester, a dog $i$ on the rod $j$ and loosely secured to the bracket $i'$ and provided with an extension or projection $o$ to engage with the pinion $J'$ and $J^2$, a spring $i^3$, secured to the frame of the harvester and pressing with its free end against the dog $i$, a crook $j^4$ in the rod $j$, as shown, in connection with a shaft R, and a shaft $R'$, provided with a pinion $t^2$, a segment $v$, a shaft J, provided with pinions $J^2$ and $J^3$, a rack $a$, a lever and rod $L^4$, provided with a stud $L^5$, as and for the purpose described.

5. In a harvester, the combination of a shaft J, provided with a pinion $J^2$ and a pinion $J^3$ to engage with a rack $a$, a lever L, provided with an arm $L'$, the lever L and arm $L'$, pivoted on the shaft J astride the pinion $J^2$, a dog $L^2$, pivoted to the lever L in position to engage with the pinion $J^2$ and provided with a rod $L^3$, pivoted to a hand-latch $P^2$, the hand-latch pivoted to the frame of the harvester, a rod $j$, supported by the frame of the harvester and provided with crooks $j'$, $j^2$, $j^3$, and $j^4$, as shown, and for the purpose described, and provided with a bracket $i'$, a lever $i^7$ to operate the rod $j$, and a support $K^3$ for the lever L, as shown, and for the purpose described.

6. In a harvester, the combination, with a shaft J, journaled in a bearing $J^6$ and in the bracket I, said bracket I secured to the bar $h$ and to the extension $f'$, adjacent the rack $a$ and bar $a^2$ and projecting rearward past the rack $a$ and curved, as shown, of a bracket $I^2$, secured in the rearward projecting curved part of the bracket I to form a bearing for the shaft J, pinions $J^2$ and $J^3$ on the shaft J, a rack $a$, a lever L, pivoted on the shaft J and provided with a dog $L^2$, a rod $L^4$, a stud $L^5$, and a dog $i$, as and for the purpose described.

GEORGE SCHUBERT.

Witnesses:
J. A. McCLELLAN,
D. Y. POOLE.